April 19, 1966 — W. R. BISHOP — 3,246,774
BALE STACKING ATTACHMENT FOR BALERS
Filed Nov. 18, 1963 — 4 Sheets-Sheet 1

WILLIAM R. BISHOP
INVENTOR
Huebner & Worrel
ATTORNEYS

April 19, 1966 W. R. BISHOP 3,246,774
BALE STACKING ATTACHMENT FOR BALERS
Filed Nov. 18, 1963 4 Sheets-Sheet 2
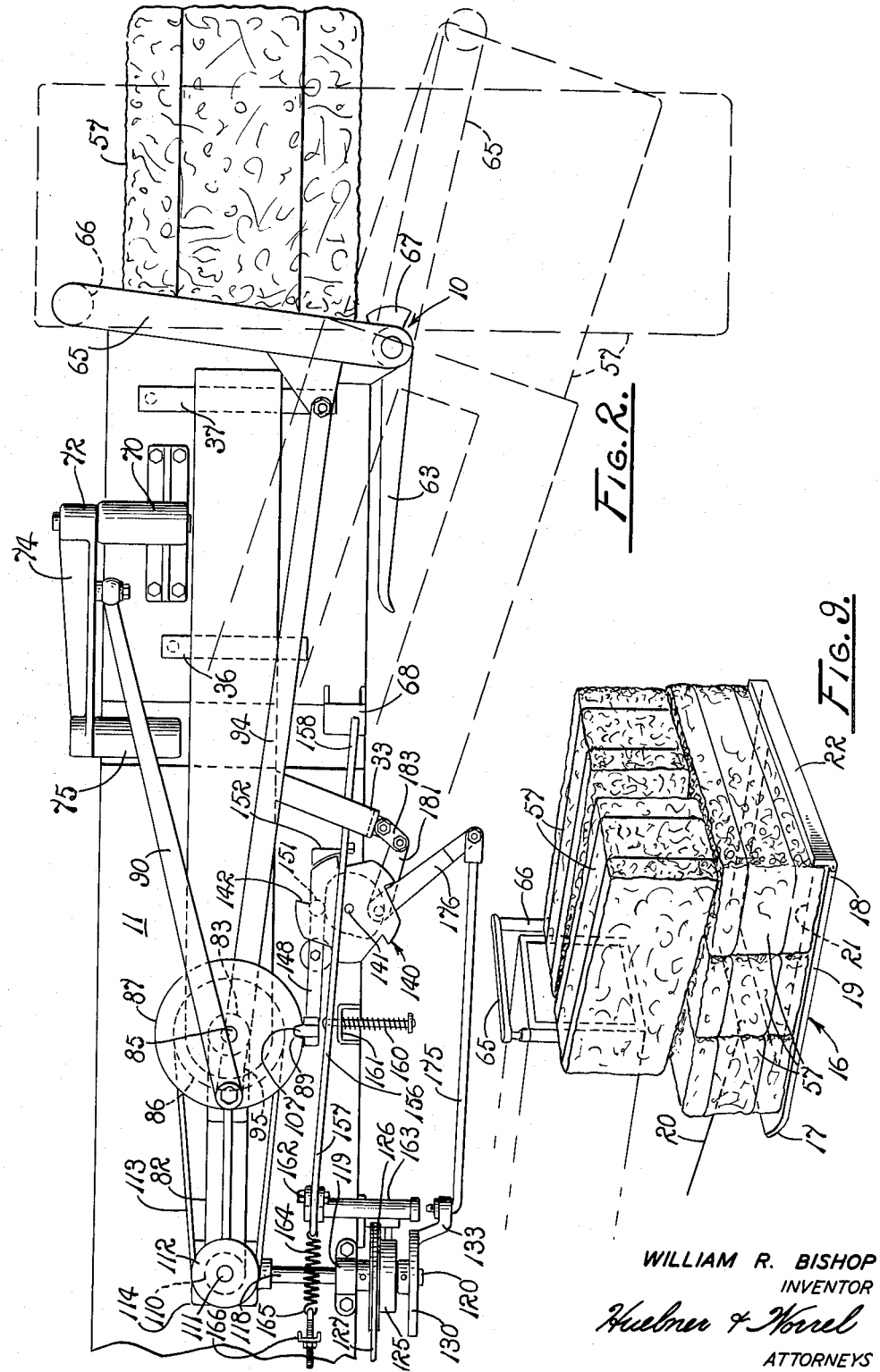
WILLIAM R. BISHOP
INVENTOR
Huebner & Worrel
ATTORNEYS April 19, 1966  W. R. BISHOP  3,246,774
BALE STACKING ATTACHMENT FOR BALERS
Filed Nov. 18, 1963  4 Sheets-Sheet 3
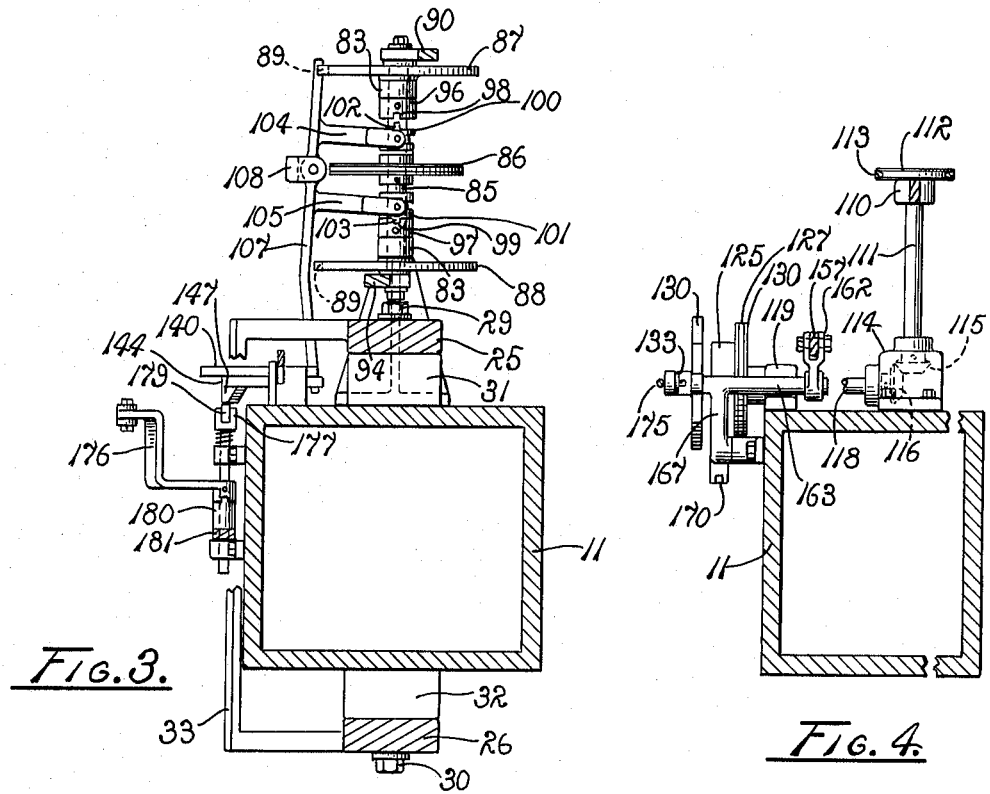

April 19, 1966 W. R. BISHOP 3,246,774
BALE STACKING ATTACHMENT FOR BALERS
Filed Nov. 18, 1963 4 Sheets-Sheet 4

WILLIAM R. BISHOP
INVENTOR

Huebner & Worrel
ATTORNEYS

United States Patent Office 3,246,774
Patented Apr. 19, 1966

3,246,774
BALE STACKING ATTACHMENT FOR BALERS
William R. Bishop, P.O. Box 67, Willow Ranch, Calif.
Filed Nov. 18, 1963, Ser. No. 324,261
10 Claims. (Cl. 214—6)

The present invention relates to a bale stacking attachment for balers and more particularly to such a bale stacking attachment which automatically manipulates bales ejected from such a baler into substantially square multi-layer stacks of bales for convenient subsequent handling.

During the baling of hay, straw, and other forage crops, balers conventionally discharge finished bales one at a time onto the ground as they are motivated through the field. As a result, bales are indiscriminately scattered and must subsequently be gathered and stacked on a wagon, truck or other transporting vehicle for removal from the field. Although such bale gathering is usually accomplished by mechanical means, such as by bale loaders, the task is time-consuming and tedious to operators of such equipment due to the large number of manipulations required to pick up and accumulate the scattered bales. Other baling operations include connecting a wagon in trailing relation to the baler so that bales being ejected therefrom can be manually caught and stacked on the wagon by workmen riding thereon. Such operation is tedious and dangerous to such workmen since the bales are usually stacked to a considerable height to achieve a load of sufficient size for efficient handling.

In an attempt to overcome these problems, automatic bale stacking attachments have been provided but only with limited success. One such attachment deposits the first two bales ejected from the baler in edgewardly erect position on the ground and then positions the third bale ejected from the baler in superimposed relation thereon. Such stacks of bales somewhat alleviate the problem of having bales indiscriminately scattered about the field but in such edgewardly erect positions the bales are not in proper attitude for convenient pick up and subsequent stacking on a truck or wagon. Other bale stacking attachments of the prior art successively manipulate as many as eight bales for deposit as a unit on the ground in two equal layers of four bales each with corresponding bales in the layers in congruent relation. Such stack configuration is easily toppled and is not readily adapted to be picked up as a unit. Further, when such stacks topple into mixed piles, bale pick up is even more difficult. While such conventional bale stacking devices have been of aid, it has long been recognized that improvement is needed.

Therefore, it is a broad object of the present invention to provide an improved bale stacking attachment for balers.

Another object is to provide such an improved bale stacking attachment which substantially eliminates manual handling of bales during harvesting operations.

Another object is to provide a bale stacking attachment which is capable of forming a multi-layer stack of bales for efficient handling thereof.

Another object is to provide a bale stacking attachment wherein the bales of the separate layers of the stack are overlapped for maximum stack stability.

Another object is to provide a bale stacking attachment of the character described having a bale ejecting mechanism which automatically discharges the first three bales in predetermined edge to edge relation and automatically ejects the next two bales in right angular overlapped relation thereon.

Other objects and advantages of the present invention will subsequently become more clearly apparent upon reference to the following description.

In the drawings:

FIG. 2 is a top plan view of the bale stacking attachment of FIG. 1.

FIG. 3 is a transverse vertical section through the bale stacking attachment taken on line 3—3 of FIG. 1.

FIG. 4 is a transverse vertical section taken on line 4—4 of FIG. 1.

FIG. 5 is a transverse vertical section taken on line 5—5 of FIG. 1.

FIG. 9 is a perspective view of a stack of bales formed by the bale stacking attachment of the present invention which are rested on a sled pulled behind the baler.

Figure 1:
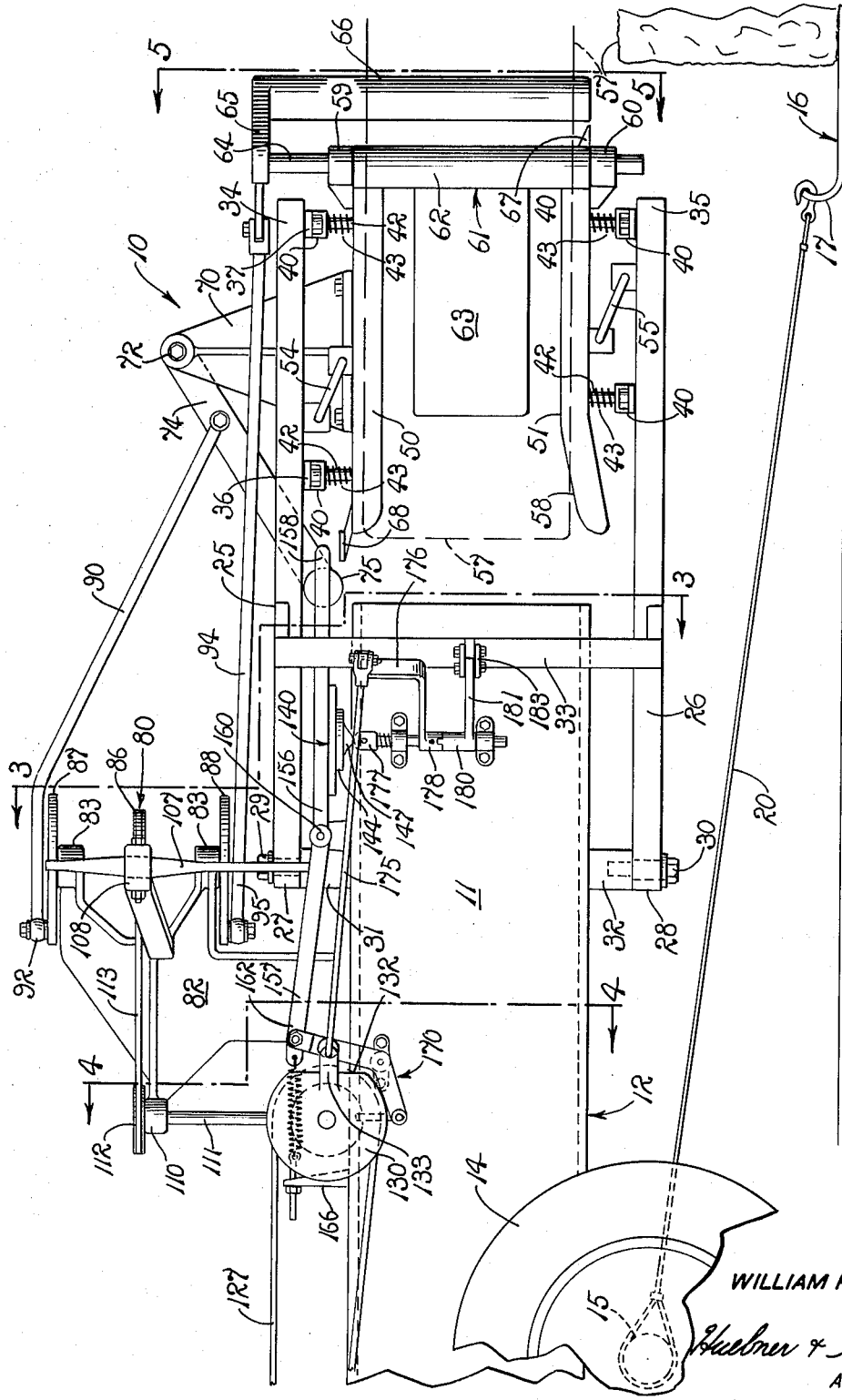
FIG. 1 is a side elevation of the bale stacking attachment of the present invention mounted on the rearward bale discharging chute of a baler.

Referring more particularly to the drawings, a bale stacking attachment embodying the principles of the present invention is indicated generally at 10. As best shown in FIG. 1, the bale stacking attachment is shown mounted on the rearward end of a bale discharge chute 11 of a baler fragmentarily shown at 12. The baler is mounted for earth traversing movement on rear wheels, one of which is shown at 14, having a transverse axle 15. A sled 16 having a forward end 17, an opposite rearward end 18, and opposite side runners 19 is drawn behind the baler by an elongated cable 20 connected to the forward end of the sled and to the axle of the baler in a position to receive bales ejected from the bale stacking attachment 10. The sled includes a central opening 21 which, during earth traversement, permits earth engagement of bales deposited thereon for movement of the bales rearwardly against a backing member 22 hinged to the rearward end 18 of the sled. The backing member can be manipulated to a position permitting further rearward sliding of bales off the sled by suitable control means, not shown.

The bale stacking attachment 10 includes an upper support arm 25 and an opposite lower support arm 26 which have forward ends 27 and 28, respectively. The forward ends of the support arms are pivotally mounted in spaced substantially parallel relation on the rearward end of the chute 11 of the baler 12 by pivot bolts 29 and 30, respectively. The pivot bolts are individually screw-threadably received within a pair of mounting bosses 31 and 32 rigidly mounted on the chute, as by welding or the like. A side bar 33 is rigidly connected to the upper and lower support arms in interconnecting relation for horizontal simultaneous swinging movement of the support arms about the aligned vertical axes of the pivot bolts 29 and 30 in a clockwise direction from the full line position to the alternate dashed line position of FIG. 2.

The support arms 25 and 26 include rearward ends 34 and 35, respectively, which individually mount a pair of longitudinally spaced hanger bars 36 and 37. A plurality of U-shaped straps 40 are mounted on the hanger bars of the upper and lower support arms in facing relation. A plurality of elongated rods 42 are individually rigidly mounted on the hanger bars and are extended through suitable apertures in the straps. As best shown in FIG. 2, the forwardmost hanger bars 36 mount two such strap and rod assemblies while the rearwardmost hanger bar 37 mounts four such strap and rod assemblies in equally spaced relation thereon. As best shown in FIG. 1, a plurality of compression springs 43 are disposed about the rods 42. The springs 43 of the upper straps are disposed between their respective hanger bars and the bottom of their U-shaped straps while the springs associated with the lower support arms are rested on the upper surface of their U-shaped straps.

A pair of upper and lower bale holding or guiding plates 50 and 51, respectively, are individually mounted on the extended ends of the upper and lower sets of rods 42 and have forward ends 52 and rearward ends 53. The plates are stabilized by upper and lower sets of pivot links 54 and 55, respectively, pivotally connected between the plates and their respective upper and lower support arms 25 and 26. The plates are disposed in substantially parallel relation precisely to receive a bale 57 shown in dashed lines in FIG. 1. The lower plate 51 includes a forwardly declining bale camming portion 58 to guide bales being ejected from the chute 11 of the baler into the guiding plates 50 and 51. Each of the upper and lower plates has a corner bearing 59 and 60, respectively, outwardly extended therefrom in substantially vertically aligned relation. A pivot post 61 is journaled in the bearings 59 and 60 and has an enlarged diameter central spacer portion 62 between the bearings. The guide plates are thereby jointly supported in floating relation on the springs 42 which normally position the plates in slightly elevated position from a straight longitudinal path rearwardly of the chute 11. A transverse bale turning and ejecting plate 63 is rigidly mounted on the pivot post 61 in forwardly extended relation therefrom alongside and between the guide plates 50 and 51.

The pivot post also includes an upwardly extended portion 64 which has a transversely extended integral arm 65 extended over the guide plates which includes a depending bale stop arm 66. A bale turning ledge 67 is rigidly mounted on the lower portion of the post for contacting and tumbling the bale during ejection from the stacking attachment 10. A trigger plate 68 is rigidly mounted on the forward end of the upper guide plate 50 in forwardly angularly upwardly extended relation therefrom. An upwardly extended pedestal 70 is mounted on the upper guide plate 50 and provides an upper bearing and shaft assembly 72. An elongated lever 74 is pivotally mounted on the shaft in forwardly downwardly extended relation therefrom and has an inwardly extended endward bale ejecting arm 75 mounted thereon for reciprocable swinging movement between the guide plates 50 and 51.

The bale turning and ejecting plate 63 and the bale ejecting arm 75 are actuated by a clutch and drive wheel assembly generally indicated by the reference numeral 80 which assembly is mounted on an upwardly extended superstructure 82 secured to the chute 11 of the baler 12. The superstructure provides a pair of forwardly extended substantially vertically aligned spaced bearings 83 through which is extended an elongated shaft 85. A drive pulley 86 is mounted on the shaft intermediate the bearings. An upper crank wheel 87 and a lower crank wheel 88 are freely rotatably mounted on the shaft outwardly adjacent to their respective upper and lower bearings 83. Each of the crank wheels has a peripheral notch 89 therein. The notches are aligned with each other. An elongated crank arm 90 is forwardly eccentrically pivotally mounted on the upper crank wheel 87 and is rearwardly extended therefrom and terminates in a rearward end 92 pivotally mounted intermediate the ends of the ejecting arm support lever 74. A crank arm 94 is forwardly eccentrically pivotally mounted on the lower crank wheel 88 and is rearwardly extended therefrom and terminates in a rearward end 95 pivotally connected to the transverse upper arm 65 for actuating the bale turning and ejecting plate 63.

Each of the upper and lower crank wheels 87 and 88 provides an inner hub portion 96 and 97, respectively, having aligned notches 98 and 99 therein. A pair of sliding collars 100 and 101 are splined for longitudinal movement on the shaft 85 and individually provide drive pawls 102 and 103, respectively, for selective driving engagement with their adjacent notches 98 and 99 in the hubs. The collars are individually pivotally connected to a pair of arms 104 and 105 which are interconnected for simultaneous movement of the collars by a control bar 107. The control bar is pivotally mounted intermediate the collars to a bracket 108 integrally extended from the superstructure 82. During pivoting movement, the control bar 107 is selectively receivable within the peripheral notches 89 in the upper and lower crank wheels 88 and 87.

A forwardly extended bearing 110 on the superstructure 82 rotatably mounts a substantially vertically disposed shaft 111. The shaft mounts a drive pulley 112 having a V-belt 113 trained about it and the drive pulley 86 providing driving connection to the shaft 85. The lower end of the shaft 111 is journaled in a gear box 114 and mounts a pinion gear 115 which meshes in driving relation with a bevel gear 116 mounted on a substantially horizontal drive shaft 118 journaled in the box. The drive shaft 118 is rotatably supported in a bearing block 119 secured to the top of the chute 11 of the baler 12 and is extended transversely outwardly from the chute and terminates in an outer end 120.

A master drive clutch mechanism 125 having a pulley wheel portion 126 is mounted on and selectively coupled with the extended end 120 of the drive shaft 118. The master drive clutch is continuously driven from a power source on the baler, not shown, through a V-belt fragmentarily indicated at 127. The master drive clutch is effective to transmit rotary power to the clutch and driven wheel assembly 80 for rotating the upper and lower crank wheels 87 and 88 one full 360° turn incident to the ejection of each bale from the chute 11 of the baler 12 in a manner subsequently to be described more fully. A power wheel 130 is mounted on the extended end 120 of the drive shaft 118 adjacent to the drive clutch 125. The power wheel has a flat surface 132 on its periphery and an integral outwardly extended eccentric arm 133.

Figure 6:
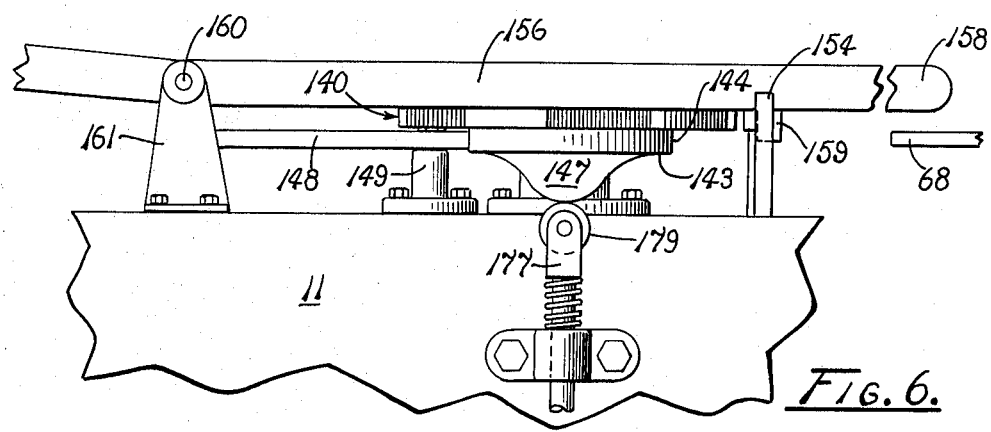
FIG. 6 is a fragmentary somewhat enlarged side elevation of the timing and triggering mechanism of the bale stacking attachment.
Figure 7:
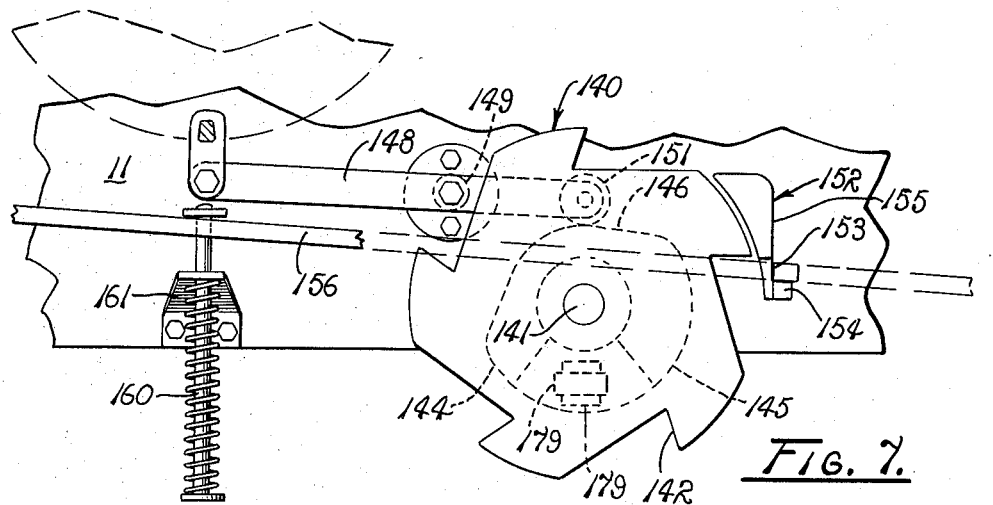
FIG. 7 is a fragmentary somewhat enlarged top plan view of the timing and triggering mechanism.

A segmented counterwheel 140 is rotatably mounted on the chute 11 of the baler 12 by a shaft 141 and provides a plurality of actuating shoulders 142 corresponding in number to the number of bales to be stacked in each stack unit. The counterwheel has a lower dual camming surface 143 providing a concentrically related cam track 144 having a large circle segment 145 and a continuous relatively small circle segment 146. The dual camming surface 143 also provides a ramp camming member 147 disposed in depending relation from the large circle segment of the cam track 144. As best shown in FIGS. 6 and 7, a lever 148 is pivoted intermediate its ends on a pedestal 149 secured to the chute. The lever mounts at its rearward end a roller 151 which rollably engages the concentric cam track 144 of the lower camming surface 143. The opposite end of the lever 148 is pivotally connected to the lower end of the control bar 107 associated with the clutch and drive wheel assembly 80. A latch member 152 is rigidly mounted on the chute 11 of the baler 12 rearwardly adjacent to the counterwheel 140. The latch has a notched locking shoulder 153, a stop lug 154 and a rearward guide surface 155.

An elongated trip lever 156 having opposite forward and rearward ends 157 and 158, respectively, is extended longitudinally of the chute 11 of the baler 12 in overlying relation to the counterwheel 140. The trip lever has a downwardly extended finger 159 adapted to fit over the locking shoulder 153 of the latch 152 and against the stop lug 154 thereof. As best shown in FIG. 7, the trip lever is normally held in such position by a transversely disposed spring loaded rod 150 extended through the trip lever intermediate its ends which is mounted by a bracket 161 on the chute. The rearward end 158 of the trip lever is disposed in overlying relation to the trigger plate 68 of the bale guide plate 50. The forward end 157 of the trip lever is pivotally connected to an upstanding bifurcated lever 162 which is mounted for longitudinal swinging movement on the end of a cross shaft 163 disposed rearwardly adjacent to the master drive clutch 125 and power wheel 130. The trip lever is normally urged in a forward direction by a tension spring 164 connected to the forward end thereof which has an opposite forward end 165 adjustably connected to an upstanding bracket 166 secured to the chute 11. An upstanding stop lever 167 is mounted on the cross shaft 163 in longitudinally spaced relation to the bifurcated lever 162 in coplanar relation with the power wheel 130. The stop lever has a forward side surface 168 engageable with the flat surface 132 on the power wheel. An arm and dog assembly 170 is also integral with the cross shaft 163 and is extended therefrom in a forward direction to engage and actuate the drive clutch 125.

An elongated connecting rod 175 is pivotally mounted on the eccentric arm 133 of the power wheel 130 and is rearwardly extended therefrom for connection with a swing lever 176. The swing lever is connected to the upper end 177 of a sliding clutch mechanism 178. The upper end of the sliding clutch mounts a roller 179 which rollably engages the ramp camming member 147 during rotation of the counterwheel 140. The sliding clutch 178 includes a lower end 180 having an outwardly extended integral lever 181 pivotally connected at its extended end to the side bar 33 of the upper and lower support arms 25 and 26 by a bracket 182 and a connecting link 183.

*Operation*

The operation of the described embodiment of the subject invention is believed to be clearly apparent and is briefly summarized at this point. During the baling operation, the baler 12 is towed about a field of forage crop with the sled 16 disposed in following relation. The first bale ejected from the chute 11 initially contacts the forwardly extended bale camming portion 58 of the lower guide plate 51. Such action causes the guide plates 50 and 51 to be lowered from their normally somewhat upwardly disposed position in floating relation between the upper and lower sets of springs 43. As the bale enters the compartment between the guide plates, the springs 43 are compressed to align the guide plates with the chute 11. After the bale is fully ejected from the chute, the springs 43 return the guide plates upwardly so that the rearward end 158 of the trip lever 156 is engaged and lifted by the trigger plate 68 on the upper guide plate 50.

Figure 8:
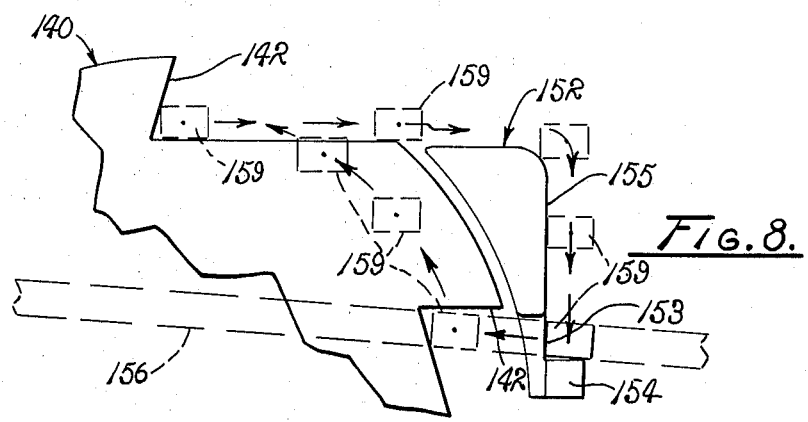
FIG. 8 is a fragmentary further enlarged top plan view of the timing and triggering mechanism showing the path of movement thereof in successive dashed line positions.

Such raising of the trip lever 156 lifts the finger 159 off the locking shoulder 153 to permit the tension spring 164 to pull the finger 156 of the trip lever against the adjacent actuating shoulder 142 of the counterwheel 140, as shown by the arrows and successive dashed line positions of the finger in FIG. 8. Continued forward movement of the trip lever 155 under the influence of the spring 163 causes the counterwheel to rotate one increment of rotation. At this time, the roller 151 of the lever 148 causes the control bar 107 to pivot about its connection with the bracket 108 to shift the sliding collars 100 and 101 to the positions shown in FIG. 3. In such position, the upper end of the control bar 107 is engaged in the notch in the upper crank wheel 87 in holding relation thereto and the lower end of the control bar is removed from the notch in the lower crank wheel 88. Also, the drive pawl 102 of the upper collar 100 is removed from the notch 98 in the hub 96 of the upper crank wheel 87 and the drive pawl 103 of the collar 101 is engaged in the notch 99 of the lower crank wheel 88.

Also, during forward movement of the trip lever 156 and the bifurcated lever 162, cross shaft 163 rotates the arm and dog assembly 170 in a counterclockwise direction, as shown in FIG. 1, to release the drive clutch 125 for one full turn of rotation. Such movement of the cross shaft and the arm and dog assembly is permitted by the stop lever 167 swinging inwardly of the power wheel until the forward side surface 168 of the stop lever abuts the flat surface 132 on the power wheel. Rotary movement of the drive clutch 125 is transmitted through the drive shaft 118, the pinion and bevel gears 115 and 116, and the pulley 112 to rotate the shaft 111. Such drive is transmitted by the shaft to the lower crank wheel 88. The lower crank wheel is rotated one full turn wherein the first half or 180° of movement is effective to extend the lower crank arm 94 connected to the transverse upper arm 65 of the pivot post 61. During such movement of the pivot post, the turning and ejecting plate 63 thereof engages the side of the bale between the upper and lower guide plates 50 and 51. With continued pivotal movement thereof, the bale is swung to the transverse dashed line position of FIG. 2. As the bale approaches such position, the bale strikes the ledge 67 which rolls the bale one-quarter turn as it falls onto the sled 16 against the stop arm 66. The bale stop arm insures that the bale is actuated no more than one-quarter of a turn so that the wire or string side of the bale is rested against the runners 19 of the sled. After deposit on the sled, the bale is engaged by crop stubble extended through the opening 21 in the sled so that with forward movement of the sled, the deposited bale slides rearwardly thereof until stopped by the backing member 22.

The power wheel 130 is rotated concurrently with the drve clutch 125 so that the periphery thereof engages the forward side surface 168 of the stop lever 167. Such action causes the cross shaft 163 and the bifurcated lever 162 to be rotated in a clockwise direction as shown in FIG. 1 to return the trip lever 156 rearwardly to its starting position with the rearward end 158 thereof overlying the trigger plate 68 and with the finger 156 thereof again disposed in locking engagement with the latch 152. Such movement is plotted in FIG. 8 with the transverse positioning of the trip lever and finger along the rearward guide surface 155 of the latch 152 being accomplished under the urging of the spring loaded rod 160 until the finger abuts the stop lug 154. Also during movement of the powered wheel 130, the lever 181, the bracket 182, and the connecting link 183 remain in a static condition since the sliding clutch 178 is disconnected.

The above operation is repeated for the number two and three bales ejected from the chute 11 of the baler 12 during which time the roller 151 continually engages the large circle segment 145 of the concentric cam track 144 so that upon rotation of the drive clutch 125, the control bar 107 and the clutch and drive mechanism 80 remain as originally positioned in FIG. 3 during ejection of the first three bales.

With ejection of the fourth bale from the chute 11, the upper end 177 of the sliding clutch 178 is lowered to engage the lower end 180 thereof incident to engagement of the roller 179 with the ramp camming member 147 by rotation of the counterwheel 140 upon release of the trip lever 156 in the above described manner. Upon rotation of the power wheel 130 through its first 180° of rotation, the connecting rod 175 is thrust in a forward direction to rotate the swing lever 176 in a clockwise direction, as viewed in FIG. 2, causing the lever 181, through the sliding clutch 178, to pivot the support arms 25 and 26 about the axis of their pivot bolts 29 and 30. Such movement of the support arms pivots the bale stacking attachment 100 to the dashed line position of FIG. 2.

At the same time, the roller 151 rides inwardly against the small circle segment 146 of the concentric cam track 144 to pivot the lever 148 from the position of FIG. 3 to a position wherein the lower end of the control bar 107 is extended into the pheripheral notch 89 in the lower crank wheel 88 in holding relation thereto and is swung outwardly of the peripheral notch 89 in the upper crank wheel 87. Concurrently, the collars 100 and 101 are slid upwardly on the drive shaft 111 to disengage the pawl 103 from the notch 99 and to position the pawl 102 into the notch 98 in the hub 96 of the upper drive wheel 87. Power is transmitted from the drive clutch 125 to the drive shaft 111 in a manner identical to that previously described but in this instance to rotate the upper crank wheel 87 one complete turn. During the first 180° movement of the wheel, the push rod 90 is extended to swing the ejecting arm 75 in a counterclockwise direction, as viewed in FIG. 1. During such movement, the ejecting arm abuts the forward end of the bale between the guiding plates 50 and 51 to eject the bale in a substantially straight longitudinal path from the stacking attachment 10 for deposit across the previously deposited first three bales and in substantially right angular relation thereto. During the second 180° movement of the upper crank wheel 87, the ejecting arm 75 is retracted to the full-line position of FIG. 1. Also, during the second 180° movement of the power wheel 130 the connecting rod 175 is rearwardly extended to return the support arms 25 and 26 also to the straightened full line position of FIG. 1.

Upon ejecton of the fifth bale from the chute 11 to cause the raising of the trip lever 155 and rotation of the counterwheel 140 as before, the sliding clutch 178 is disengaged by movement of the ramp camming member 147 past the roller 179 to render rotation of the power wheel 130 inoperative to shift the support arms 25 and 26. Upon actuation of the drive clutch 125 to rotate the drive shaft 111 and the ejecting arm 75 in the previously described manner, the fifth bale is ejected in a straight longitudinal path from the stacking attachment in superimposed relation to the first three bales and alongside the fourth bale.

In view of the foregoing, it is readily apparent that the structure of the present invention has provided an improved bale stacking attachment for bales which forms successive stacks of five bales for convenient subsequent pick up and handling thereof. The bales are stacked in two layers with the bales of the upper stack being superimposed in overlapping right angular relation to the bales of the lower stack for increased stack stability over that formed by conventional bale stacking attachments.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A bale stacking attachment, for balers having an elongated bale discharge chute extended therefrom and power actuating means on the baler effective to motivate bales through the chute in longitudinally aligned relation for discharge therefrom in a substantially rectilinear path, comprising a support, bale guide means mounted on the support in substantially aligned bale receiving relation to said chute providing a single path for individual successive movement of bales therethrough, transverse bale ejecting means mounted on said guide means for movement through said rectilinear path of such bales to turn the bales within the path and to discharge the bales endwardly from the stacking attachment in transversely disposed relation to said rectilinear path, and endward bale ejecting means mounted on the guide means in longitudinally spaced relation to said transverse ejecting means for movement through said rectilinear path to discharge subsequent bales in an attitude corersponding to said longitudinally aligned relation of the bale when discharged from the chute for placement in superimposed right angular overlapping relation on bales previously discharged by the transverse ejecting means.

2. A bale stacking attachment, for balers having an elongated bale discharge chute extended therefrom and power actuating means on the baler effective to motivate bales through the chute in longitudinally aligned relation for discharge therefrom in a substantially rectilinear path, comprising support means mounting the stacking attachment on said baler, bale guide means mounted on the support means in aligned bale receiving relation to said chute providing a single path for individual successive movement of bales therethrough, transverse bale ejecting means mounted on said guide means for movement through said rectilinear path of such bales to turn the bales within the path and to discharge the bales endwardly from the stacking attachment in transversely disposed relation to said rectilinear path, endward bale ejecting means mounted on the guide means in longitudinally spaced relation to said transverse ejecting means for movement through said rectilinear path to discharge subsequent bales in an attitude corresponding to said longitudinally aligned relation of the bales when discharged from the chute for placement in superimposed right angular overlapping relation on bales previously discharged by the transverse ejecting means, and means interconnecting said transverse and endward bale ejecting means with the power actuating means on the baler for sequential operation of the transverse and endward bale ejecting means incident to the discharge of bales from the chute.

3. A bale stacking attachment, for balers having an elongated bale discharge chute extended therefrom and power actuating means on the baler effective to motivate bales through the chute in longitudinally aligned relation for discharge therefrom in a substantially rectilinear path, comprising support means mounting the stacking attachment on said baler, bale guide means mounted on the support means in aligned bale receiving relation to said chute providing a single path for individual successive movement of bales therethrough, transverse bale ejecting means mounted on said guide means for movement through said rectilinear path of such bales to turn the bales within the path and to discharge the bales endwardly from the stacking attachment in transversely disposed relation to said rectilinear path, endward bale ejecting means mounted on the guide means in longitudinally spaced relation to said transverse ejecting means for movement through said rectilinear path to discharge subsequent bales in an attitude corresponding to said longitudinally aligned relation of the bales when discharged from the chute for placement in superimposed right angular overlapping relation on bales previously discharged by the transverse ejecting means, means interconnecting said transverse and endward bale ejecting means with the power actuating means on the baler for sequential operation of the transverse and bale ejecting means incident to the discharge of bales from the chute, and timing and triggering means connected to said means interconnecting the transverse and endward bale ejecting means with the power actuating means on the baler for sequential operation of the transverse and endward bale ejecting means incident to the discharge of bales from the chute.

4. A bale stacking attachment, for balers having an elongated bale discharge chute extended therefrom and power actuating means on the baler effective to motivate bales through the chute in longitudinally aligned relation for discharge therefrom in a substantially rectilinear path, comprising support means mounted on the baler and extended therefrom for supporting the stacking attachment on the baler, a pair of spaced substantially parallel bale guide members mounted on the support means in aligned bale receiving relation to said chute with said rectilinear path of the bales passing therebetween to provide a single path for individual successive movement of the bales therethrough, a transverse bale ejecting member pivotally mounted on said guide members for swinging movement through said rectilinear path of such bales between the guide members to turn the bales within the path and to discharge the bales endwardly from the stacking attachment in transversely disposed relation to the rectilinear path, and an endward bale ejecting member pivotally mounted on the guide members in longitudinally spaced relation to said transverse ejecting member for swinging movement through the rectilinear path between said guide members to discharge bales subsequent to the discharge of bales by said transverse bale ejecting member in an attitude corresponding to said longitudinally aligned relation of the bales when discharged from the chute of the baler for placement in superimposed right angular overlapping relation on such bales previously discharged by the transverse ejecting member.

5. A bale stacking attachment, for balers having an elongated bale discharge chute extended therefrom and power actuating means on the baler effective to motivate bales through the chutes in longitudinally aligned relation for discharge therefrom in a substantially rectilinear path, comprising support means mounted on the baler and extended therefrom, a pair of spaced substantially parallel upper and lower bale guide members mounted on the support means in aligned bale receiving relation to said chute with said rectilinear path of the bales passing therebetween and having predetermined forward and rearward ends, a transverse bale ejecting member pivotally mounted on said rearward ends of the guide members for swinging movement through said rectilinear path of such bales between the guide members to discharge bales from the stacking attachment in transversely disposed relation to the rectilinear path, an endward bale ejecting member pivotally mounted on the upper guide member in longitudinally spaced relation to said transverse ejecting member for swinging movement adjajent to said forward ends of the guide members through the rectilinear path between the guide members to discharge bales subsequent to the discharge of bales by said transverse bale ejecting member in an attitude corresponding to said longitudinally aligned relation of the bales when discharged from the chute of the baler for placement in superimposed right angular overlapping relation on such bales previously discharged by the transverse ejecting member, and drive means interconnecting said transverse and endward bale ejecting means with the power actuated means on the baler for sequential operation of the transverse and endward bale ejecting means incident to the discharge of bales from the chute.

6. A bale stacking attachment, for balers having an elongated bale discharge chute extended therefrom and power actuating means on the baler effective to motivate bales through the chute in longitudinally aligned relation for discharge therefrom in a substantially rectilinear path, comprising support means mounted on the baler and extended therefrom, a pair of spaced substantially parallel upper and lower bale guide members mounted on the support means in aligned bale receiving relation to said chute with said rectilinear path of the bales passing therebetween and having predetermined forward and rearward ends, a transverse bale ejecting member pivotally mounted on said rearward ends of the guide members for swinging movement through said rectilinear path of such bales between the guide members to discharge bales from the stacking attachment in transversely disposed relation to the rectilinear path, an endward bale ejecting member pivotally mounted on the upper guide member in longitudinally spaced relation to said transverse ejecting member for swinging movement adjacent to said forward ends of the guide members through the rectilinear path between the guide members to discharge bales subsequent to the discharge of bales by said transverse bale ejecting member in an attitude corresponding to said longitudinally aligned relation of the bales when discharged from the chute of the baler for placement in superimposed right angular overlapping relation on such bales previously discharged by the transverse and endward bale ejecting means with the power actuated means on the baler for sequential operation of the transverse and endward bale ejecting means incident to the discharge of bales from the chute, and timing and triggering means connected to said drive means for sequential operation of the transverse and endward bale ejecting means incident to the discharge of bales from the chute.

7. A bale stacking attachment, for balers having an elongated bale discharge chute extended therefrom and power actuating means on the baler effective to motivate bales through the chute in longitudinally aligned relation for discharge therefrom in a substantially rectilinear path, comprising support means mounted on the baler and extended therefrom, a pair of spaced substantially parallel upper and lower bale guide plates having predetermined forward and rearward ends, resiliently compressible means mounting said bale guide plates on said support means in floating rearwardly aligned bale receiving relation to said chute with said rectilinear path of the bales passing therebetween, trigger means mounted on said forward end of the upper bale guide plate, a transverse bale ejecting plate pivotally mounted between said rearward ends of the bale guide plates for swinging movement about a substantially vertical axis through said rectilinear path of such bales between the guide plates to discharge bales from the stacking attachment in transversely disposed relation to the rectilinear path, an endward bale ejecting arm pivotally mounted on the upper guide plate in longitudinally spaced relation to said transverse ejecting plate for swinging movement about a substantially horizontal axis adjacent to said forward ends of the guide plates through the rectilinear path between the guide plates to discharge bales subsequent to the discharge of bales by said transverse bale ejecting plate in an attitude corresponding to said longitudinally aligned relation of the bales when discharged from the chute of the baler for placement in sperimposed right angular overlaping relation on such bales previously discharged by the transverse ejecting plate, drive means selectively interconnecting said transverse ejecting plate and said endward ejecting arm with the power actuating means on the baler, a trip member pivotally mounted on the chute for engagement by said trigger means on the upper guide plate incident to the discharge of a bale between said guide plates to connect said drive means to said power actuating means, bale counting means mounted on the chute for engagement by said member, and means interconnecting said counting means and said drive means for sequential operation of the transverse bale ejecting plate and the endward bale ejecting arm incident to the discharge of bales from the chute for forming a multi-layer stack of bales with said layers arranged in said superimposed right angular overlapping relation.

8. A bale stacking attachment adapted to form a multi-layer stack of five bales, for balers having an elongated bale discharge chute rearwardly extended therefrom and power actuating means on the baler effective to motivate bales through the chute in longitudinally aligned relation for discharge therefrom in a substantially rectilinear path, comprising a pair of elongated support arms having forward and rearward ends, said forward ends being pivotally mounted on the chute and rearwardly extended therefrom in spaced substantially parallel relation, a pair of spaced substantially parallel upper and lower bale guide plates having predetermined forward and rearward ends, resiliently compressible means mounting said bale guide plates on the support arms in floating rearwardly aligned bale receiving relation to said chute with said rectilinear path of the bales passing therebetween, a trigger plate mounted on said forward end of the upper bale guide plate, a transverse bale ejecting plate pivotally mounted between said rearward end of the guide plate for swinging movement about a substantially vertical axis through said rectilinear path of such bales between the guide plates to discharge a predetermined number of bales from the stacking attachment in transversely disposed relation to the rectilinear path, an endward bale ejecting arm pivotally mounted on the upper guide plate in longitudinally spaced relation to said transverse ejecting plate for swinging movement about a substantially horizontal axis adjacent to said forward ends of the guide plates through the rectilinear path between the guide plates to discharge a predetermined number of bales subsequent to the discharge of bales by said transverse bale ejecting plate in an attitude corresponding to said longitudinally aligned relation of the bales when discharged from the chute of the baler for placement in superimposed right angular overlapping relation on such bales previously discharged by the transverse ejecting plate, dual drive means selectively interconnecting said transverse ejecting plate and said endward ejecting arm with the power actuating means on the baler, a trip member pivotally mounted on the chute for engagement by said trigger means on the upper guide plate incident to the discharge of the bale between said guide plates to connect said dual drive means to said power actuating means, a bale counting member having a plurality of segments corresponding to the number of bales in the stack mounted on the chute for engagement by said trip member during engagement of the trip member by the trigger means, lever means interconnecting said bale counting member with said dual drive means for selective connection of the dual drive means to the transverse bale ejecting plate and the endward bale ejecting arm, and a connecting rod selectively connecting said power actuating means on the baler to said support arms for pivoting the arms to displace the stacking attachment transversely of its normally aligned position behind the chute.

9. The bale stacking attachment of claim 8 wherein the stack of bales formed thereby has a bottom layer of three bales and a top layer of two bales, the dual drive means includes a pair of spaced crank wheels individually connected to said transverse bale ejecting plate and to the endward bale ejecting arm, a clutch mechanism interposed the crank wheels, and clutch control means pivotally mounted between said crank wheels and having connection with said lever means so that said transverse ejecting plate is effective to discharge the first three bales from the chute to form said bottom layer of bales in the stack and said endward bale ejecting arm is effective to discharge the succeeding two bales to form the bottom layer of bales in said overlapped right angular relation.

10. The bale stacking attachment of claim 8 wherein said bale counting member is rotatably mounted on the chute and includes a lower cam surface having a continuous concentrically disposed cam track providing a large circle segment and a relatively small circle segment engageable by the lever means for actuating said clutch control member, said lower cam surface of the counter member providing a depending ramp camming portion, a clutch mechanism mounted on the chute having a roller engageable with said ramp camming member to engage the clutch so that said connecting rod is effective to swing the support arms transversely of the chute during ejection of the fourth bale from the stacking attachment and to return the arms to said aligned position prior to ejection of the fifth bale therefrom.

References Cited by the Examiner
FOREIGN PATENTS
236,703  12/1961  Australia.

GERALD M. FORLENZA, *Primary Examiner.*
MORRIS TEMIN, *Examiner.*